R. SCHILLING.
MEASURING AND FILLING APPARATUS.
APPLICATION FILED JAN. 26, 1910.

994,875.

Patented June 13, 1911.

3 SHEETS—SHEET 1.

WITNESSES.
Arthur L. Slee
S. Constine

INVENTOR.
R. Schilling
by M. A. Acker
his Atty.

R. SCHILLING.
MEASURING AND FILLING APPARATUS.
APPLICATION FILED JAN. 26, 1910.

994,875.

Patented June 13, 1911.

3 SHEETS—SHEET 2.

WITNESSES.
Arthur L. Slee.
S. Constine.

INVENTOR.
R. Schilling
by N. A. Acker
his Atty

THE NORRIS PETERS CO., WASHINGTON, D. C.

R. SCHILLING.
MEASURING AND FILLING APPARATUS.
APPLICATION FILED JAN. 26, 1910.

994,875.

Patented June 13, 1911.

3 SHEETS—SHEET 3.

Witnesses:
Arthur L. Slee.
S. Constine

Inventor:
R. Schilling
by R. A. Acker
his atty.

UNITED STATES PATENT OFFICE.

RUDOLPH SCHILLING, OF OAKLAND, CALIFORNIA.

MEASURING AND FILLING APPARATUS.

994,875.              Specification of Letters Patent.    Patented June 13, 1911.

Application filed January 26, 1910. Serial No. 540,213.

*To all whom it may concern:*

Be it known that I, RUDOLPH SCHILLING, a citizen of the United States, residing at Oakland, in the county of Alameda and State of California, have invented certain new and useful Improvements in Measuring and Filling Apparatus, of which the following is a specification.

The hereinafter described invention is designed for use in connection with the filling of cans with condiments generally, such as pepper and mustard, although its use is not restricted to such commodities, inasmuch as it is applicable for the filling of cans, packages or cartons with dry substances of a powdered form, as for instance, baking powder.

In general, the object of the invention is the production of an apparatus which will remove the dry material to be canned or packed from a common source of supply, and measure from such material a quantity sufficient to fill a can, package or carton with a given weight, and deliver the same into the can, package or carton situated to receive such separated and measured material, the can, package, or carton when filled being preferably automatically removed from the measuring and filling mechanism.

To comprehend the invention reference should be had to the accompanying sheets of drawings, wherein—

Figure 1:
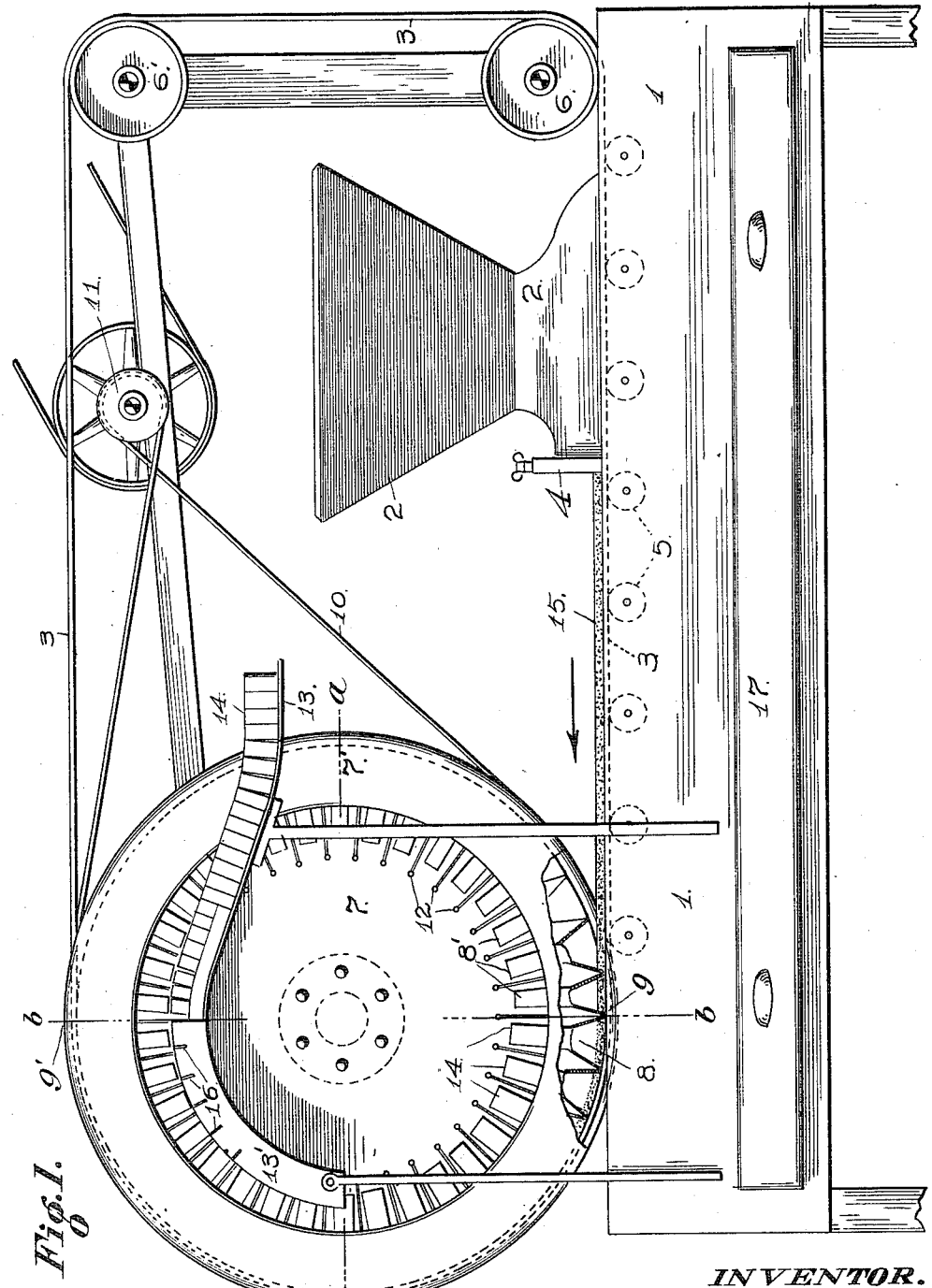
Figure 2:
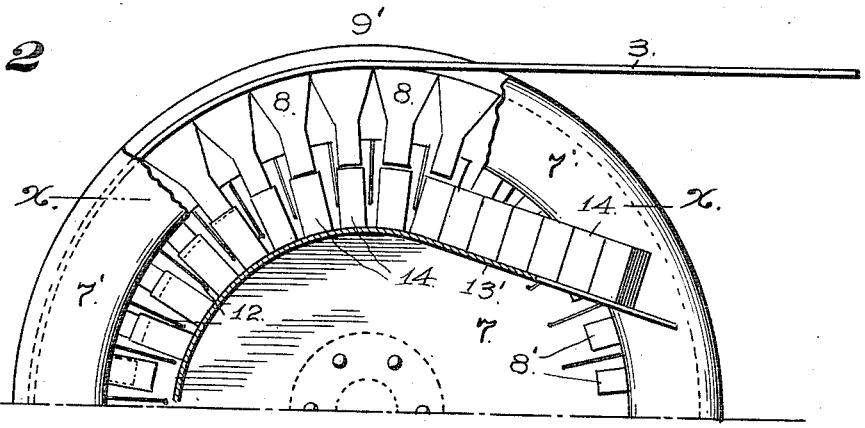
Figure 3:
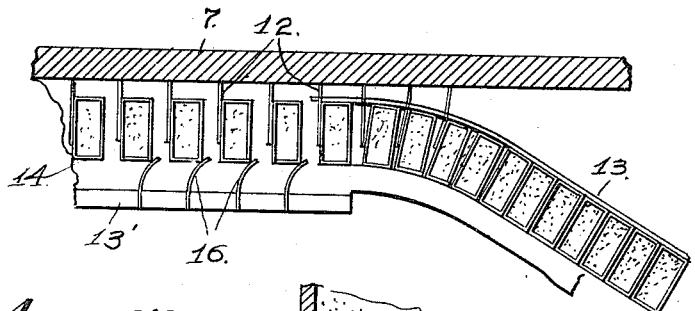
Figure 4:
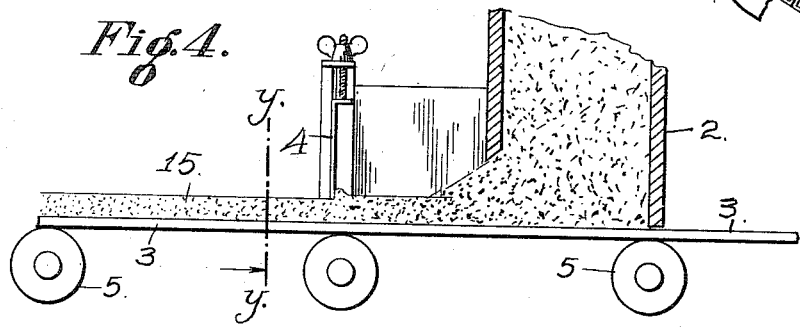
Figure 5:
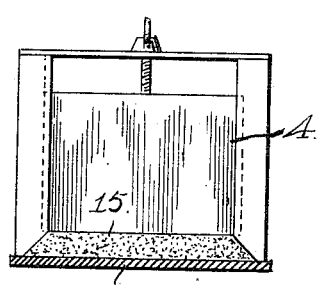
Figure 6:
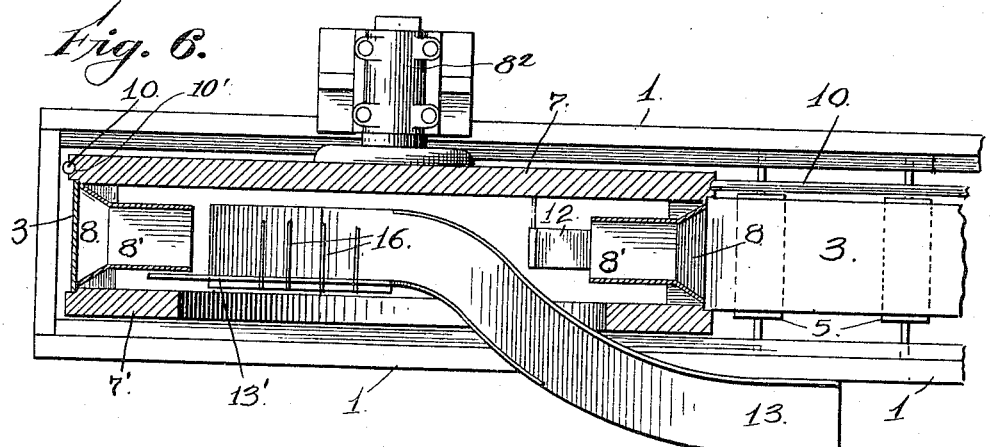
Figure 7:
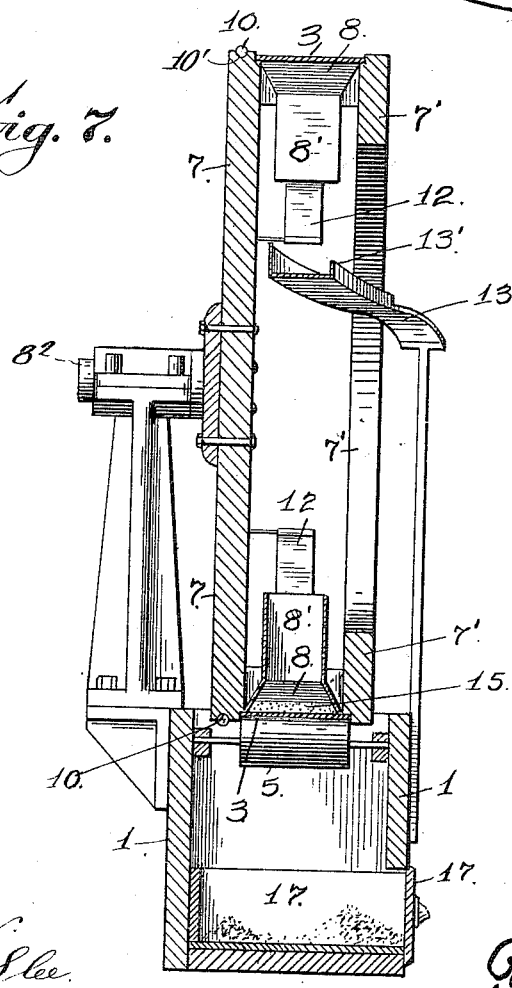

Figure 1 is a side view of the apparatus with its measuring and filling carrier wheel partly broken away, the cans, packages or cartons to be filled being illustrated as applied to the discharge tube section of the measuring and separating funnels, and the filled cans, packages or cartons being disclosed as passing onto the discharge chute or runway. Fig. 2 is an enlarged broken side view of the upper section of the measuring and filling carrier wheel, illustrating the gradual lowering of the filled cans, packages or cartons from the discharge tube section of the measuring and separating funnels, and the passing thereof onto the discharge chute or runway. Fig. 3 is an enlarged broken plan view of the apparatus taken on line $x$—$x$, Fig. 2 of the drawings, said view illustrating the plates for propelling and delivering the filled cans, packages or cartons onto the discharge chute or runway during the rotary movement of the measuring and filling carrier wheel, and the spring fingers which project inwardly from the receiving section of the discharge chute or runway to act against the filled cans, packages or cartons to settle the material therein, the cartons being illustrated in full, the cartons being shown in full lines for the purpose of securing clearness of illustration. Fig. 4 is a broken longitudinal sectional view of the reservoir or hopper for the material to be delivered into the cans, packages, or cartons, illustrating the endless carrier belt, and the slide gate for regulating the depth of the material removed by the carrier belt from within the supply reservoir or hopper. Fig. 5 is a cross sectional elevation taken on the line $y$—$y$ Fig. 4 of the drawings. Fig. 6 is a broken plan view of the apparatus with the carrier wheel in section, certain of the radial disposed funnels being omitted for clearness of the drawings, the carrier wheel being sectioned on line $a$—$a$ Fig. 1 of the drawings, and the discharge chute or runway and the receiving platform for the filled cans being illustrated. Fig. 7 is a vertical cross section taken on line $b$—$b$, Fig. 1 of the drawings, through the axis of the carrier wheel, said view disclosing the relative position of the various parts; for clearness of illustration certain of the several radial disposed funnels being omitted.

In the drawings, the numeral 1 is used to designate any suitable form of a supporting structure, at one end of which is located a supply hopper or reservoir 2 for the material. The said hopper or reservoir is an open bottomed one and beneath the same travels an endless carrier belt 3, which receives onto the surface thereof and removes from the said hopper or reservoir the material to be delivered into the cans, packages or cartons to be filled. At the forward end of the hopper or reservoir 2 is arranged a vertically movable slide gate 4, which acts as a gage plate for the material carried by the endless carrier belt from within the said hopper or reservoir. It is by means of this gage plate that the depth of the layer of material carried by the endless carrier belt 3 from within the hopper or reservoir 2 is regulated, the said gate also serving to strike level the material so as to give an even surface thereto. The endless carrier belt 3 rests on the supporting rollers 5 mounted within bearings of the supporting structure 1 being held in tension by the rolls 6—6' over which the same works, and the said belt also works over the measuring and filling carrier wheel, serving during such portion of its travel as a band belt for the said carrier wheel.

The rotary measuring and filling carrier wheel comprises a disk 7, to which is secured a spaced ring section 7', and between these is arranged a series of circumferentially and radially disposed funnels 8, each funnel terminating in a discharge tube section 8'. The carrier wheel thus formed is mounted on a suitable supporting shaft $8^2$ and held a slight distance above the supporting structure 1, the said carrier belt 3, between the points 9 and 9', bearing firmly against the open funnels 8 of the rotary carrier wheel and holding the same closed. The rotary carrier wheel is driven by means of the drive belt 10, working within a circumferential groove 10' cut in the outer face of the disk 7 thereof, the said belt 10 working over the drive pulley 11, driven from any suitable source of supply.

Between the circumferentially disposed funnels 8 the guide plates 12 are arranged, the same projecting from the inner face of the disk 7, which plates, as hereinafter explained, serve to guide the filled cans, packages, or cartons onto the discharge chute or runway 13, which extends at an outward inclination from the receiving platform 13', arranged within the sphere of the ring section 7' of the rotary measuring and filling carrier wheel and in alinement with and directly beneath the line of filled cans, packages or cartons 14.

The cans, packages or cartons 14 are slipped onto the open end of the discharge tube section 8' of the funnels 8, by an attendant stationed at one side of the apparatus for such purpose.

During the operation of the apparatus, the funnels 8 successively bear onto the layer of material 15 forwardly propelled by the endless carrier 3, so that by the time the rotary carrier wheel has reached approximately the point 9, the mouth of the funnel 8 will rest on and bear firmly against the upper surface of the endless carrier 3 and a given section or quantity of the layer 15 of the material resting thereon removed and confined within the funnel 8, on the discharge tube section 8' of which a can, package or carton 14 has been loosely placed. As the rotary carrier continues its movement, the endless belt carrier traveling therewith and maintaining closed the open funnel 8 with its load therein, the material within the funnel gradually, due to gravity, flows into and through the discharge tube section 8' into the can, package or carton 14 fitted thereon. As the rotary carrier approaches its uppermost position, the filled can, package, or carton gradually, due to its own weight and that of the material delivered therein, slips from off the discharge tube section 8' onto the curved receiving platform 13', so that by the time the point 9' is reached, the filled can, package or carton is entirely free of the section 8' of the funnel 8. As the filled cans, packages or cartons move from off the section 8' of the funnels 8 onto the receiving platform 13', they are maintained in an upright position by means of the guide plates 12, which not only serve to propel the said filled packages over the receiving platform, but to guide the same onto the outwardly inclined discharge chute or runway section 13 thereof. As the filled cans, packages or cartons are carried over the surface of the receiving platform 13', they are acted on successively by the spring fingers 16, inwardly projecting from the outer wall of said platform, the striking of which against the filled cans causes the material to settle therein.

Each funnel 8 cuts a given size section from the layer of material on the surface of the endless carrier, hence the dimensions of the funnels, taken with the width and depth of the layer of material on the surface of the endless carrier 3, previously determined, give the exact quantity of material for each can, package or carton, so that each receives the same amount of material. By merely raising and lowering the gage plate 4 of the hopper or reservoir 2, the depth of the material on the endless carrier 3 may be increased and decreased, which accordingly will vary the quantity delivered into the cans, packages or cartons. Such of the material as is not taken into the funnels 8, falls from the endless carrier, and, in the present case, enters an open drawer 17 in the supporting structure 1 and is thus recovered.

The funnels 8 may be considered and treated as measuring devices by means of which a given section is separated from the body of material, which section is indicative of a known weight, so that said funnels not only serve as a means for filling the cans, packages or cartons, but likewise to measure the quantity of material to be delivered thereto. Inasmuch as the depth of the material on the endless traveling carrier belt is a known one, and the size of the measuring funnels uniform, it follows that the same quantity of material is delivered into each of the cans, packages or cartons to be filled.

By the employment of the described apparatus, the use of weighing means for determining the quantity of material to be delivered into the empty cans, packages or cartons is dispensed with, and, as the working of the machine is automatic, with, in the present case, the exception of placing the empty cans, packages, or cartons onto the tubular discharge sections of the measuring funnels, the work of measuring the material and filling the empty cans, packages or cartons is materially decreased over the means at present employed and the daily output of the plant correspondingly augmented, which necessarily reduces the expense incident to such work.

The outer ends of the circumferentially disposed funnels 8 are held a slight distance from the periphery of the disk 7 and spaced ring 7' of the carrier wheel, so that the endless carrier belt 3 during a portion of its travel will be confined between the inner wall of the disk 7 and ring 7', Figs. 1, 6 and 7 of the drawings, the distance between the same being approximately equal to the width of the said endless carrier belt.

The expression package as hereinafter referred to in the claims is intended to cover and include cans and cartons.

I am aware that changes may be made in the arrangement of parts and the details of construction herein shown and described for carrying out the object of the present invention and this without departing from the spirit thereof, hence I do not wish to be understood as confining myself to the particular apparatus illustrated herein, but, on the contrary, desire to cover broadly traveling means for removing material from a supply reservoir, combined with mechanism for separating therefrom a section indicative of a given weight and transferring the said section into a can, package or carton to be filled.

Having thus described the invention what is claimed as new and desired to be protected by Letters Patent is—

1. An apparatus for the described purpose, the same comprising a supply reservoir, means working therein for the removal of a layer of dry material therefrom of uniform depth, mechanism for separating from such material a section thereof indicative of a given weight and devices carried thereby for receiving such separated material and discharging the same into a package to be filled.

2. An apparatus for the described purpose, the same comprising a supply reservoir, means working therein for the removal of a layer of dry material therefrom of uniform depth, mechanism for separating from such removed material a section thereof indicative of a given weight, devices carried by said mechanism for supporting packages to be filled and guiding the material therein, and means for removing the filled packages.

3. An apparatus for the described purpose, the same comprising a supply reservoir, means working therein for the removal of a layer of dry material therefrom of uniform depth, and including a gage for regulating the depth of the material so removed, mechanism for separating from such removed material a section thereof indicative of a given weight, and devices carried by the said mechanism for receiving and delivering the separated material into packages to be filled.

4. In an apparatus for the described purpose, the combination with a supply reservoir, an endless carrier belt working therethrough for the removal of a layer of material therefrom, a gage for regulating the depth of the material removed by the endless carrier belt, mechanism acting against the surface of the endless carrier belt for separating from such material a section thereof indicative of a given weight and devices carried by said mechanism for receiving said separated material and discharging the same into packages to be filled.

5. An apparatus for the described purpose, the same comprising a supply reservoir, an endless carrier belt working therethrough for the removal of material therefrom, means for regulating the depth of the removed material, a carrier wheel over which the endless carrier works, and devices within said wheel for separating the material on the endless carrier into sections each indicative of a given weight and discharging the same into packages to be filled.

6. In an apparatus for the described purpose, the combination with a supply reservoir, of means working therein for the removal of material therefrom, a gage device for regulating the depth of the removed material, and mechanism for separating from such material a section indicative of a given weight and devices carried by said mechanism for receiving and delivering the severed sections of material into packages to be filled.

7. In an apparatus for the described purpose, the combination with an endless carrier belt for the material to be packed, of a carrier wheel over which said belt works, having a series of circumferentially disposed funnels secured thereto for removing sections of material from the carrier belt each indicative of a given weight, a discharge tube section to each funnel for the reception of a package to be filled, a stationary receiving platform for the filled packages, a discharge runway extended therefrom, and means on the carrier wheel for guiding the filled packages onto said runway.

8. In an apparatus for the described purpose, the combination with a traveling carrier for the material to be packed, of rotary mechanism for removing sections of the material therefrom each indicative of a given weight, and devices carried by said mechanism for receiving the packages to be filled and guiding therein the severed sections of the material.

9. In an apparatus for the described purpose, the combination with the carrier wheel thereof, of a series of circumferentially disposed severing funnels, each provided with a discharge tube section for receiving the packages to be filled and guiding the material therein, a platform for receiving the filled packages as moved from off the discharge tube sections, devices secured to the carrier wheel for maintaining the filled packages in position and moving the same along the platform, and spring fingers extended from the said platform acting against the filled packages to settle the material therein.

10. An apparatus for the described purpose, the same comprising means for receiving and forwardly carrying a layer of material of a given depth, mechanism acting thereon to remove sections of said material each indicative of a given weight, and devices carried by said mechanism for receiving the severed sections of material and discharging the same into packages to be filled.

11. In an apparatus for the described purpose, the combination with a supply reservoir, of an endless carrier belt working therethrough for receiving and conveying material therefrom, a gage for regulating the depth of the material removed from the reservoir, a carrier wheel over which the endless carrier works and having a series of circumferentially disposed separating devices secured thereto for severing sections of the material each indicative of a given weight, the said devices receiving and guiding the material toward packages to be filled.

In testimony whereof I have signed my name to this specification in the presence of two subscribing witnesses.

RUDOLPH SCHILLING.

Witnesses:
N. A. ACKER,
D. B. RICHARDS.

---

Copies of this patent may be obtained for five cents each, by addressing the "Commissioner of Patents, Washington, D. C."